United States Patent [19]
Goto

[11] Patent Number: 5,671,210
[45] Date of Patent: Sep. 23, 1997

[54] MAGNET TYPE CLAMPING MECHANISM AND DISC DRIVING APPARATUS USING THE SAME

[75] Inventor: Yoshikazu Goto, Hirakata, Japan

[73] Assignee: Matsushita Electric Industrial Co., Ltd., Kadoma, Japan

[21] Appl. No.: 599,139

[22] Filed: Feb. 9, 1996

[30] Foreign Application Priority Data

Feb. 15, 1995 [JP] Japan .................... 7-027087

[51] Int. Cl.$^6$ .................................. G11B 25/04
[52] U.S. Cl. ............................ 369/271; 369/264
[58] Field of Search ........................ 369/264, 265, 369/270, 271

[56] References Cited

FOREIGN PATENT DOCUMENTS

458666  9/1992  Japan .
64907   1/1994  Japan .

Primary Examiner—Stuart S. Levy
Assistant Examiner—William J. Klimowicz
Attorney, Agent, or Firm—Renner, Otto, Boisselle, Sklar

[57] ABSTRACT

In a magnet type clamping mechanism, a first magnet with a yoke is fixed in the outer periphery of a concave portion of a turn table which is fixed to a motor shaft. In the inner periphery of the concave portion of the turn table, a second magnet is provided on a yoke which is slidable along the shaft within a certain range. With respect to a disc having a hub with a large projection, the first magnet mainly generates clamping force. With respect to a disc having a hub with a small projection, both the first and second magnets generate clamping force, while the second magnet generates a main component of the clamping force.

17 Claims, 9 Drawing Sheets

MAGNET TYPE CLAMPING MECHANISM AND DISC DRIVING APPARATUS USING THE SAME

BACKGROUND OF THE INVENTION

1. Field of the Invention

The present invention relates to a magnet type clamping mechanism used for mounting and securing, on a turn table, a recording medium with a hub including a magnetic plate. More specifically, the present invention relates to a magnet type clamping mechanism with compatibility to clamp two kinds of recording mediums having hubs with heights different from each other; and a disc driving apparatus including such a magnet type clamping mechanism.

2. Description of the Related Art

Figure 10:
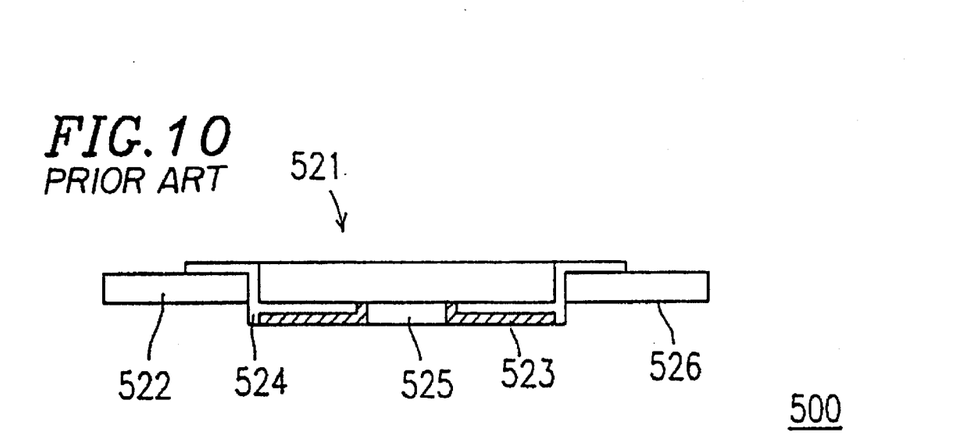
FIG. 10 is a cross-sectional view showing a configuration of the MO disc made in accordance with the international standards.
Figure 11:
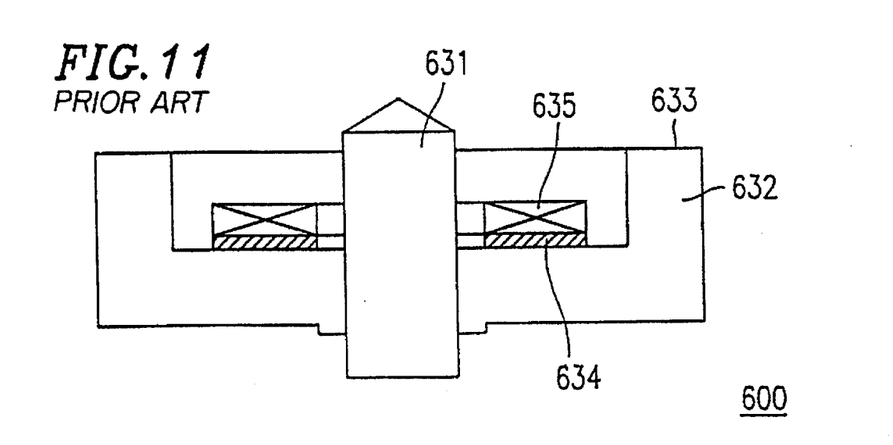
FIG. 11 is a cross-sectional view showing a configuration of a conventional magnet type clamping mechanism.
Figure 12:
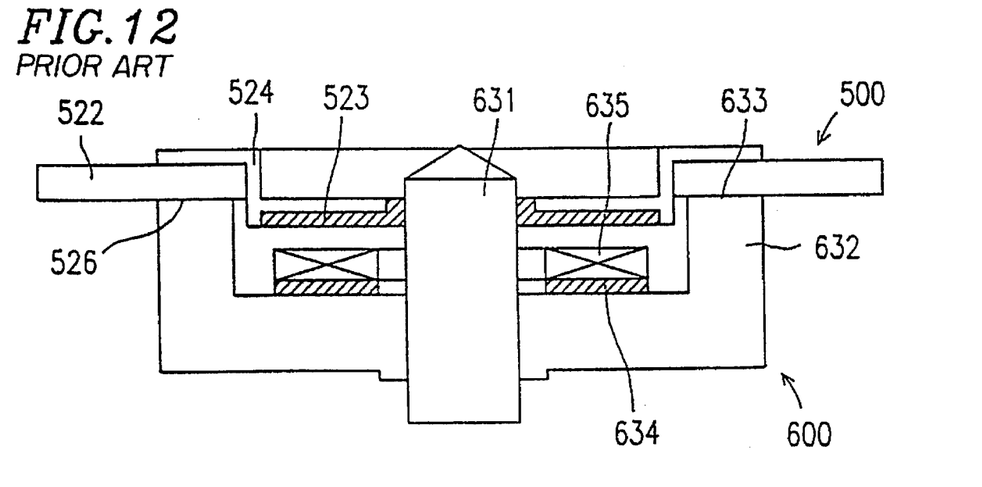
FIG. 12 is a cross-sectional view showing a state in which the MO disc shown in FIG. 10 is clamped to the magnet type clamping mechanism shown in FIG. 11.

As one of recording mediums with hubs including magnetic plates, FIG. 10 shows a 90 mm magneto-optical recording disc 500 (hereinafter, referred to as "an MO disc") which meets international standards. As a clamping mechanism for mounting and securing the MO disc 500 on a turn table of a disc motor provided to a disc driving apparatus, a clamping mechanism in which the adsorption force generated by magnets is utilized is generally used (hereinafter, such a clamping mechanism is referred to as "a magnet type clamping mechanism"). FIG. 11 shows a conventional magnet type clamping mechanism 600. Moreover, FIG. 12 shows a state in which the MO disc 500 shown in FIG. 10 is mounted and secured on a turn table 632 interlocked to a disc motor (not shown) in the magnet type clamping mechanism 600 shown in FIG. 11.

The MO disc 500 includes a substrate 522 having a thickness of approximately 1.2 mm with a central hole 521, and a hub 524 secured to a central hole 521 of the substrate 522. The hub 524 includes a magnetic plate 523. The magnetic plate 523 is typically made of SUS430, and has a thickness of approximately 0.5 mm and an outer diameter of approximately 13 mm. In the center of the magnetic plate 523, a central hole 525 having a diameter of approximately 4 mm is formed to be used for being penetrated with a shaft. Moreover, in FIG. 10, the hub 524 projects from a clamping face 526 of the substrate 522 in a downward direction by approximately 1.2 mm.

In the magnet type clamping mechanism 600 shown in FIG. 11, a turn table 632 for mounting the MO disc 500 thereon is forced and secured to a shaft 631 of the disc motor (not shown). The diameter of the shaft 631 is set in such a manner that the shaft 631 fits the central hole 525 of the magnetic plate 523. The turn table 632 is in a concave shape. On the top of the outer wall surrounding the concave portion, a turn table face 633 for receiving the clamping face 526 of the substrate 522 of the MO disc 500 is provided.

Furthermore, in the concave portion of the turn table 632, a ring-shaped magnet 635 is secured via a yoke 634 having a thickness of approximately 0.5 mm. The magnet 635 is located at the position as low as approximately 1.8 mm from the turn table face 633. The magnet 635 is typically a rare earth type magnet, and the typical size thereof is approximately 1 mm in thickness, approximately 6 mm in inner diameter, and approximately 13 mm in outer diameter.

The operation mechanism of the conventional magnet type clamping mechanism 600 will now be described.

When the MO disc 500 is brought near the magnet type clamping mechanism 600 from above the turn table 632, the MO disc 500 is adsorbed to the turn table 632 due to the adsorption force generated between the magnetic plate 523 of the MO disc 500 and the magnet 635 of the magnet type clamping mechanism 600. Accordingly, the shaft 631 is inserted into the central hole 525 of the magnetic plate 523. Then, the clamping face 526 of the substrate 522 is mounted on the turn table face 633 while the shaft 631 slightly projects from the upper side of the magnetic plate 523. As a result, the MO disc 500 is mounted on the turn table 632.

Figure 13:
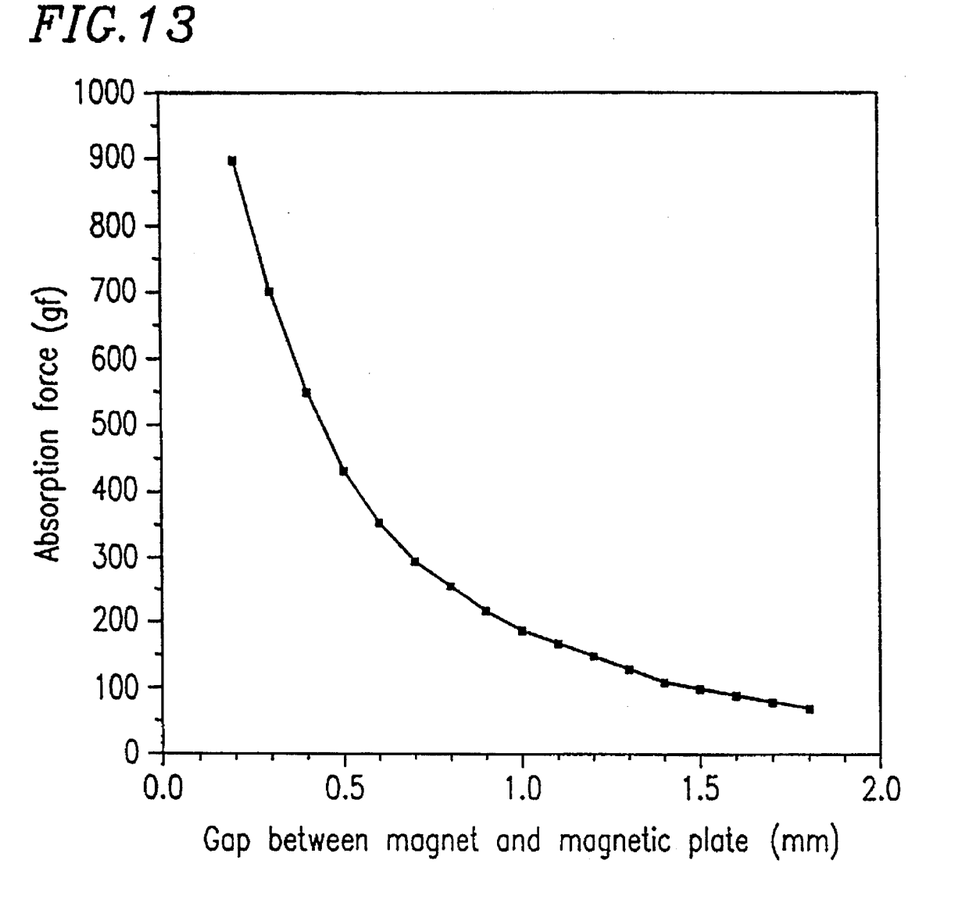
FIG. 13 is a graph showing a relationship between a gap between a magnet of the magnet type clamping mechanism and a magnetic plate of the MO disc, and an adsorption force exerting therebetween under the state shown in FIG. 12.

FIG. 13 is a graph illustrating a relationship between the magnitude of the gap between the magnet 635 of the magnet type clamping mechanism 600 and the magnetic plate 523 of the MO disc 500, and the magnitude of the adsorption force exerted therebetween.

As shown in FIG. 12, when the MO disc 500 is mounted and secured to the turn table 632 of the magnet type clamping mechanism 600, a gap between the magnet 635 and the magnetic plate 523 is typically approximately 0.6 mm. In this case, the adsorption force generated between the magnet 635 and the magnetic plate 523, that is, the clamping force exerted on the MO disc 500 is typically approximately 350 gf, as shown in FIG. 13.

The appropriate clamping force varies depending on the number of revolutions of the disc motor, the friction coefficients on the turn table face 633, and the like. However, in general, the appropriate clamping force is in a range of approximately 300 gf to 500 gf. When the clamping force is 300 gf or less, there is a possibility that the MO disc 500 may slip on the turn table 632 when the disc motor is actuated or that the MO disc 500 slips off from the turn table 632 due to an impact from outside. On the other hand, when the clamping force is 500 gf or more, a large force is required to detach the MO disc 500 from the turn table 632, which may damage the MO disc 500 or loading mechanism of the disc driving apparatus.

By international standards, the clamping force is defined to be 5N (510 gf) or less.

In recent years, a large-scale optical disc and a thin-type disc driving apparatus are increasingly in demand, and high-density optical disc having shapes different from those of MO discs have been proposed. An example of which is disclosed in Japanese Laid-Open Patent Publication No. 6-4907.

Figure 14:
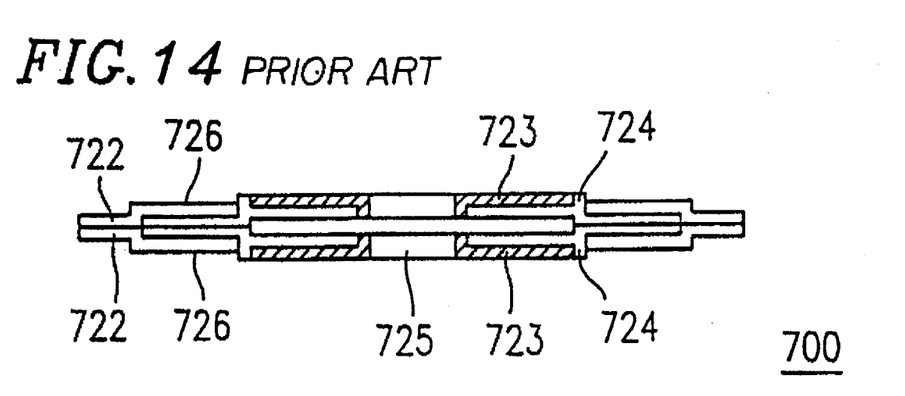
FIG. 14 is a cross-sectional view showing a configuration of a thin-type recording disc.

FIG. 14 is a cross-sectional view showing an exemplary structure of such a new thin-type disc 700.

Specifically, a thin disc 700 has a double-sided structure in which two substrates 722 having an identical structure to each other are laminated together. Each of substrates 722 has a thickness of approximately 0.6 mm with a central hole. To the central hole, a hub 724 is secured. The hub 724 includes a magnetic plate 723 which has a structure substantially identical to that of the magnetic plate 523 included in the MO disc 500 shown in FIG. 10. That is, the magnetic plate 723 is typically made of SUS430, having a thickness of approximately 0.5 mm and an outer diameter of approximately 13 mm, and in the center thereof, a central hole 725 having a diameter of approximately 4 mm is formed for sticking a core out therefrom.

In the thin-type disc 700, the hubs 724 project from clamping faces 726 by approximately 0.2 mm respectively. This value is smaller as compared with the MO disc 500 shown in FIG. 10, in order to make the disc 700 thinner.

In consideration of the compatibility between information as well as a down-sizing of system equipment, there is demand for realizing a compatible disc driving apparatus applicable to both of the MO disc 500 shown in FIG. 10 and a thin-type disc 700 shown in FIG. 14. To obtain such a compatible disc driving apparatus, it is required that both of the MO disc 500 and the thin-type disc 700 are mounted on the turn table at a predetermined clamping force.

However, in the case of obtaining such a compatible disc driving apparatus by using the magnet type clamping mechanism 600 used for the above-mentioned MO disc 500 as is explained above, there arise problems as described below:

In the thin-type disc 700, the hub 724 projects to a height of approximately 0.2 mm, which is smaller as compared with the hub 524 of the MO disc 500 (projecting in height of approximately 1.2 mm). For this reason, when the thin-type disc 700 is mounted and secured on the turn table 632 of the magnet type clamping mechanism 600, there exists a relatively large gap of approximately 1.6 mm between the magnet 635 of the magnet type clamping mechanism 600 and the magnetic plate 723 of the thin-type disc 700. Whereas a gap existing with respect to the MO disc 500 is approximately 0.6 mm and therefore a sufficient magnitude of an adsorption force is obtained, the large gap as described above exists with respect to the thin-type disc 700, so that a resultant adsorption force is as weak as approximately 100 gf, as shown in FIG. 13. Accordingly, it is impossible to obtain a predetermined clamping force (approximately 300 gf to 500 gf) such as described above.

SUMMARY OF THE INVENTION

The magnet type clamping mechanism of this invention includes: a turn table for mounting and securing a recording medium thereon; a first magnet fixed at a prescribed position on the turn table; and a second magnet provided so as to be movable between a first position and a second position. The recording medium includes at least a first recording medium having a hub with a first amount of projection and a second recording medium having a second amount of projection which is smaller than the first amount of projection. The first magnet is fixed at a position at which a first absorption force is generated on the first recording medium via a first gap in a first condition where the first recording medium is placed on the turn table, and the second magnet is in contact with the first recording medium in the first condition to generate no absorption force with respect to the first recording medium, thereby the first magnet generating a main component of a clamping force for the first recording medium in the first condition. In a second condition where the second recording medium is placed on the turn table, the second magnet generates a second absorption force on the second recording medium via a second gap and the first magnet generates a third absorption force smaller than the second absorption force via a third gap on to the second recording medium, thereby the second magnet generating a main component of a clamping force for the second recording medium.

Preferably, the first recording medium is absorbed and secured on the turn table with a first clamping force which is substantially equal to the first absorption force generated by the first magnet.

Preferably, the second recording medium is absorbed and secured on the turn table with a second clamping force which is substantially equal to a sum of the third absorption force generated by the first magnet and the second absorption force generated by the second magnet.

In one embodiment, the second magnet moves from the second position toward the first position due to an absorption force generated on to the second recording medium while the second recording medium is mounted and secured on the turn table.

In another embodiment, the first position is closer to a surface of the recording medium to be mounted and secured than the second position.

In still another embodiment, the magnet type clamping mechanism further includes an elastic member, for example, such as a compressed coil spring, for maintaining the second magnet in a spring-loaded state at the first position. Preferably, the elastic member generates a spring force which is smaller than an absorption force generated between the first magnet and the first recording medium when the second magnet is positioned at the first position. The first recording medium is absorbed and secured on the turn table with a third clamping force which is substantially equal to a difference between the first absorption force generated by the first magnet and the spring force generated by the elastic member.

In still another embodiment, the magnet type clamping mechanism further includes a non-magnetic spacer provided on an upper face of the second magnet. Preferably, the spacer is a member for absorbing impact. Preferably, a thickness of the spacer is smaller than a gap between the hub of the second recording medium and the upper face of the second magnet in the second condition.

In still another embodiment, the magnet type clamping mechanism further includes a first yoke and a second yoke. The first magnet is fixed on the first yoke and the second magnet is fixed on the second yoke. In one embodiment, the first yoke and the second yoke respectively have a shape which provides a magnetic shield between the first magnet and the second magnet so as to prevent the first magnet and the second magnet from being absorbed to each other. In another embodiment, the turn table includes a shaft made of a non-magnetic material and the second yoke includes a through hole, the shaft penetrating the through hole, thereby the second magnet moving as being guided by the shaft. In still another embodiment, a fringe of the second magnet is formed so as to come into contact with the first yoke at the first position.

According to another aspect of the invention, a disc driving apparatus is provided. The apparatus includes: the aforementioned magnet type clamping mechanism; an optical system for emitting light beams to the recording medium and for receiving and detecting reflected light beams from the recording medium to read out information recorded on the recording medium; and a circuitry for generating a signal indicative of the information recorded on the recording medium based on a detection result by the optical system.

Thus, the invention described herein makes possible the advantages of (1) providing a magnet type clamping mechanism having compatibility in a simple structure where two kinds of recording mediums respectively having hubs projecting in heights different from each other; and (2) a disc driving apparatus including such a magnet type clamping mechanism.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanied drawings.

Example 1

Figure 1:
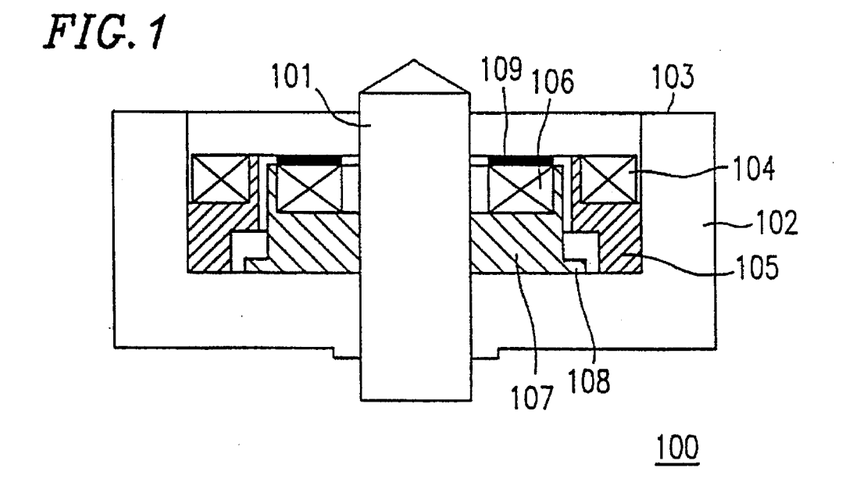
FIG. 1 is a cross-sectional view showing a configuration of a magnet type clamping mechanism according to a first embodiment of the present invention.

FIG. 1 is a cross-sectional view showing a magnet type clamping mechanism 100 according a first embodiment of the present invention.

As shown in FIG. 1, in the magnet type clamping mechanism 100, a turn table 102 is secured to a shaft 101 of a disc motor (not shown). The shaft 101 is made of a non-magnetic material, and the diameter thereof is set in such a manner that the shaft 101 fits in a central hole of a magnetic plate attached to a hub of a disc to be mounted on the turn table 102.

The turn table 102 has a cross-section in a concave shape, and a ring-shaped turn table face 103 is provided on the top of the outer wall surrounding the concave portion. The turn table face 103 typically has an inner diameter of approximately 16 mm and an outer diameter of approximately 21 mm.

On the side close to the outer wall in the concave portion of the turn table 102, a ring-shaped first magnet 104 is secured via a first yoke 105. The first magnet 104 is typically a rare earth type magnet, and the dimension thereof is approximately 1.5 mm in thickness, approximately 11 mm in inner diameter, and approximately 15.5 mm in outer diameter. The first magnet 104 is located in a position as low as approximately 1.5 mm from the turn table face 103.

On the other hand, on the inner side, i.e., on the side close to the shaft 101 in the concave portion of the turn table 102, a ring-shaped second magnet 106 is provided. The second magnet 106 is typically a rare earth type magnet, and the dimension thereof is approximately 1.5 mm in thickness, approximately 5 mm in inner diameter, and approximately 9 mm in outer diameter.

The second magnet 106 is secured to a second yoke 107 having a through hole. The second yoke 107 fits the shaft 101 with its through hole and can be slid along the shaft 101. The total weight of movable parts including the second yoke 107 and the second magnet 106 is typically approximately 5 g.

The first yoke 105 is designed so that the magnetic flux from the first magnet 104 does not leak out of the clamping direction parallel to the shaft 101. Similarly, the second yoke 107 is designed so that the magnetic flux from the second magnet 106 does not leak out of the clamping direction. Accordingly, there exist substantially no adsorption force between the first magnet 104 and the second magnet 106, and the second magnet 106 can move freely. However, the second yoke 107 includes a fringe 108 capable of coming into contact with the first yoke 105, so that the range of movement of the second yoke 107 is limited. In this way, the second magnet 106 is held in such a manner that the second magnet 106 can move between a first position close to the turn table face 103 and a second position far from the turn table face 103.

Figure 2:
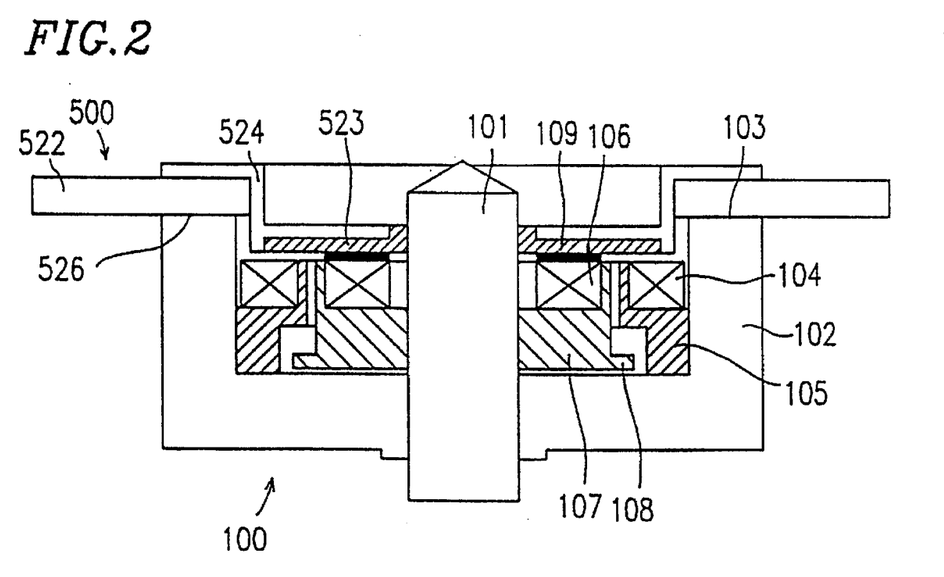
FIG. 2 is a cross-sectional view showing a state in which a first recording medium is clamped to the magnet type clamping mechanism shown in FIG. 1.

Specifically, in a structure shown in FIG. 2, the first position is a position where the second magnet 106 is positioned as high as possible along the shaft 101, and the second position is a position where the second yoke 107 is in contact with the bottom of the concave portion of the turn table 102. Typically, when the second magnet 106 is in the first position, the second magnet 106 is positioned as low as approximately 0.6 mm from the turn table face 103. When the second magnet 106 is in the second position, the second magnet 106 is positioned as low as approximately 1.8 mm from the turn table face 103.

Furthermore, on the upper side of the second magnet 106, a spacer 109 having a thickness of approximately 0.25 mm is secured. The spacer 109 is preferably made of rubber capable of absorbing impacts. The spacer 109 provides a predetermined gap between a recording medium (disc), which is mounted on the clamping mechanism 100, and the second magnet 106 when the second magnet 106 is adsorbed to the disc. In this case, when the spacer 109 is made of rubber, the spacer 109 absorbs impacts generated in the above-mentioned adsorption.

Hereinafter, the operation of the magnet type clamping mechanism 100 configured as described above will be described with reference to FIGS. 2 to 5.

Figure 3:
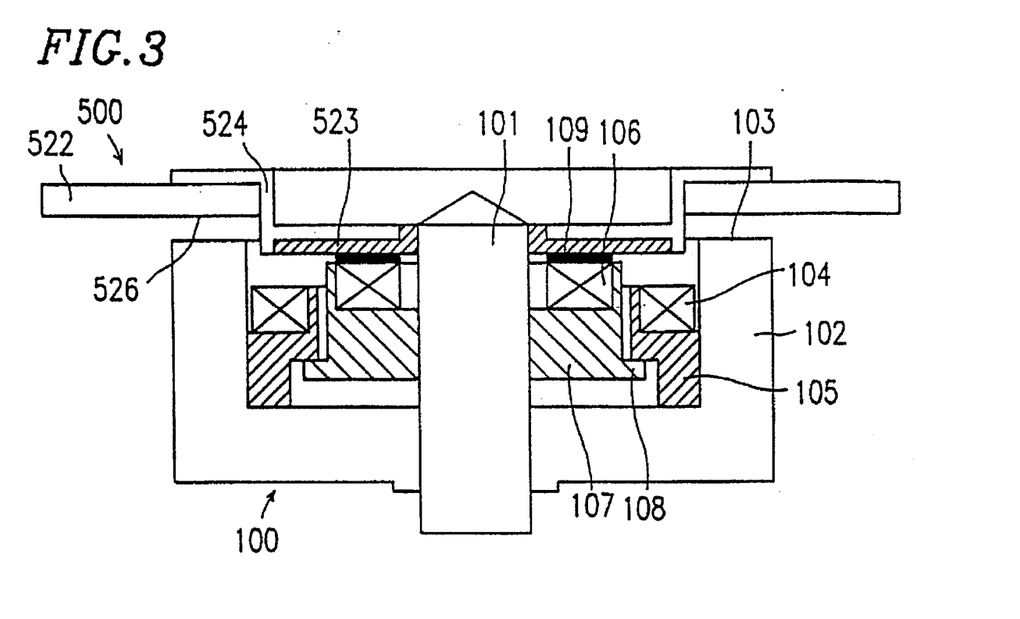
FIG. 3 is a cross-sectional view showing a state in which the first recording medium is being detached from the magnet type clamping mechanism shown in FIG. 1.
Figure 4:
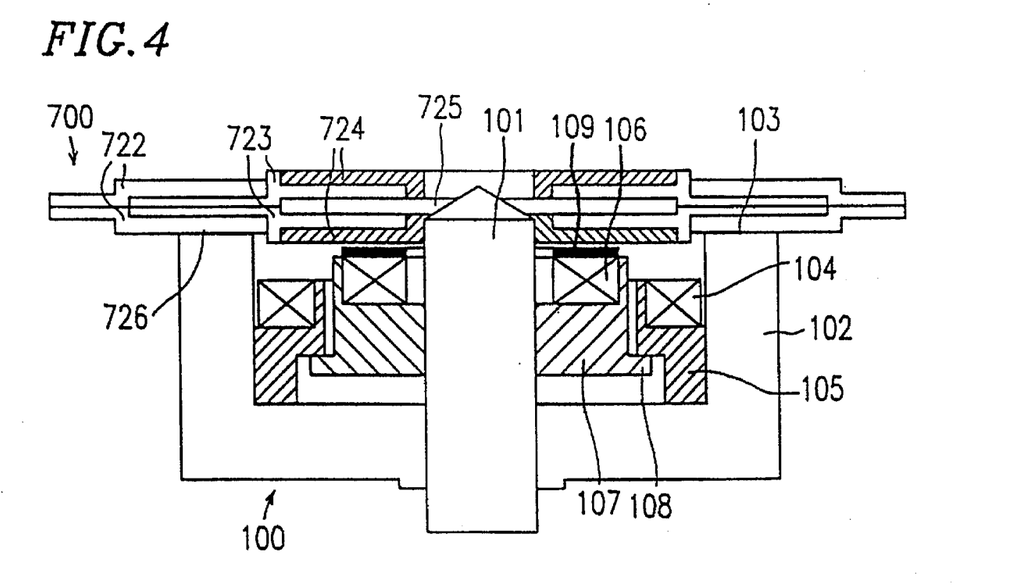
FIG. 4 is a cross-sectional view showing a state that a second recording medium is clamped to the magnet type clamping mechanism shown in FIG. 1.

FIG. 2 is a cross-sectional view showing a state in which a first recording medium is clamped to the magnet type clamping mechanism 100. FIG. 3 is a cross-sectional view showing a state in which the first recording medium is being detached from the magnet type clamping mechanism 100. FIG. 4 is a cross-sectional view showing a state in which a second recording medium having a structure different from that of the first recording medium is clamped to the magnet type clamping mechanism 100. Herein, specifically, the first recording medium is, for example, the MO disc 500 which was described with reference to FIG. 10, and the second recording medium is, for example, the thin-type disc 700 which was described with reference to FIG. 14.

Figure 5:
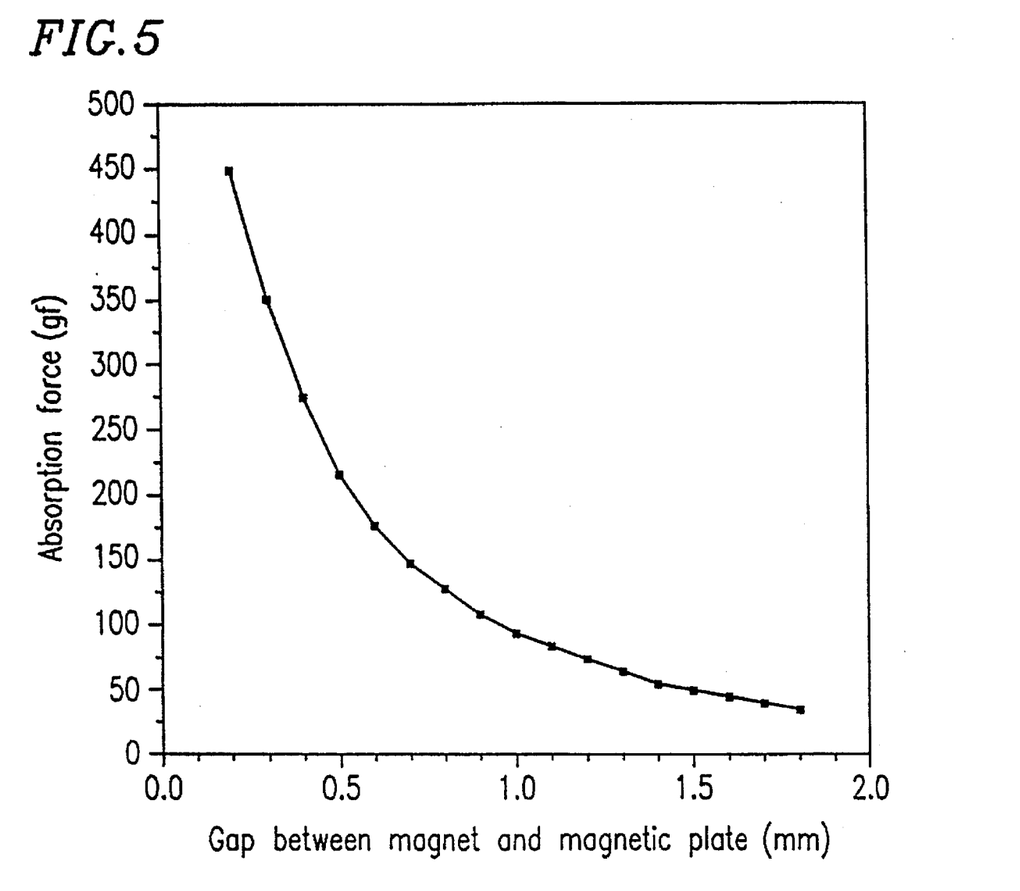
FIG. 5 is a graph showing a relationship between a gap between a first/second magnets of the magnet type clamping mechanism and a magnetic plate of an MO disc, and an adsorption force exerting therebetween under the state shown in FIG. 2.

FIG. 5 is a graph illustrating a relationship between a magnitude of a gap between the first magnet 104 or the second magnet 106 included in the magnet type clamping mechanism 100 and a magnetic plate included in a recording medium (disc) to be clamped, and a magnitude of adsorption force exerted therebetween. The first magnet 104 generates an adsorption force which is different to some extent from that generated by the second magnet 106 due to differences in shapes and the like. In FIG. 5, however, both of them are expressed as an identical curve for the purpose of simplification.

First, a case where the MO disc 500, which is the first recording medium, is clamped to the magnet type clamping mechanism 100 will be described.

When the MO disc 500 is brought near the turn table 102 from above, the MO disc 500 is adsorbed to the turn table 102 due to the adsorption force generated between the magnetic plate 523 of the MO disc 500 and the first magnet 104, so that the shaft 101 is inserted into the central hole of the magnetic plate 523. Then, the shaft 101 projects slightly from the upper side of the magnetic plate 523. As a result, the MO disc 500 is mounted on the turn table 102.

When the MO disc 500 is mounted and secured on the turn table 102, the gap between the first magnet 104 and the magnetic plate 523 is approximately 0.3 mm. The adsorption force generated via the gap in this level is approximately 350 gf as shown by the curve in FIG. 5.

On the other hand, the second magnet 106 moves from the second position to the first position when an adsorption force larger than approximately 5 gf is generated, which corresponds to the total weight of the movable parts including the second magnet 106 and the second yoke 107. Since the second position of the second magnet 106 is as low as approximately 1.8 mm from the turn table face 103, the adsorption force generated in the case where the second magnet is in the second position is approximately 35 gf as shown in FIG. 5. Accordingly, when the MO disc 500 is brought near the turn table 102 from above, the second magnet 106 moves from the second position to the first position (that is, moves upwards in the drawings), and then the magnetic plate 523 of the MO disc 500 and the spacer 109 come into contact with each other. Thereafter, the second magnet 106 together with the MO disc 500 adsorbed thereto moves downward directed to the second position since the MO disc 500 is absorbed by the first magnet 104. At the point where the clamping movement is finished, the second magnet 106 stops at the position between the first position and the second position.

In this manner, whereas the second magnet 106 adsorbs and comes into contact with the MO disc 500, the second magnet 106 does not generate any clamping force against the MO disc 500. Accordingly, the total clamping force exerted on the MO disc 500 is approximately 350 gf which is substantially derived from the first magnet 104. Thus, the predetermined clamping force falls in a preferable range of approximately 300 to 500 gf.

When the spacer 109 made of rubber is disposed on the upper side of the second magnet 106, the impact generated when the magnetic plate 523 of the MO disc 500 and the second magnet 106 come into contact with each other can be absorbed. As a result, unpleasant impact noise as well as damage to the MO disc 500 and/or the surface of the second magnet 106 are prevented.

Next, the force generated when the MO disc 500 is detached from the turn table 102 will be described.

FIG. 3 is a view illustrating the state in which the clamped MO disc 500 is about to be detached. The MO disc 500 and the second magnet 106 adsorbed thereto move upwards in FIG. 3. Specifically, FIG. 3 shows the state in which the fringe 108 of the second yoke 107 is in contact with the first yoke 105.

In this case, the detachment force exerted on the MO disc 500 is the sum of the adsorption force generated between the first magnet 104 and the magnetic plate 523 of the MO disc 500 and the adsorption force generated between the second magnet 106 and the magnetic plate 523. Typically, the gap between the first magnet 104 and the magnetic plate 523 is approximately 1.1 mm, and as shown in FIG. 5, the adsorption force in this case is approximately 80 gf. On the other hand, the gap between the second magnet 106 and the magnetic plate 523 is approximately 0.25 mm which corresponds to the thickness of the spacer 109, and as shown in FIG. 5, the adsorption force in this case is approximately 380 gf. Accordingly, the force exerted on the MO disc 500 in detachment is approximately 460 gf which is in the preferable range of the predetermined clamping force.

Without the spacer 109, the MO disc 500 is directly adsorbed to the second magnet 106, so that a larger adsorption force than the above-mentioned value would be generated therebetween. However, by providing the spacer 109, a gap is provided between the second magnet 106 and the magnetic plate 523, so that the adsorption force generated between the second magnet 106 and the magnetic plate 523 can be reduced. Accordingly, the force generated in the detachment of the MO disc 500 can be reduced.

Next, the case where the thin-type disc 700, which is the second recording medium, is clamped will be described with reference to FIG. 4.

When the thin-type disc 700 is brought near the turn table 102 from above, the second magnet 106 moves from the second position to the first position. After that, a thin-type disc 700 is adsorbed to the turn table 102 by the adsorption force generated between the magnetic plate 723 of the thin-type disc 700 and the second magnet 106, so that the shaft 101 is inserted into the central hole of the magnetic plate 723. Then, the shaft 101 is projected slightly from the upper side of the magnetic plate 723 while the clamping face 726 of the substrate 722 is mounted on the turn table face 103. As a result, the thin-type disc 700 is mounted on the turn table 102.

Even when the second magnet 106 is in the first position, there is a gap of approximately 0.15 mm between the magnetic plate 723 of the thin-type disc 700 and the spacer 109 provided on the surface of the second magnet 106. Therefore, the thin-type disc 700 and the second magnet 106 never come into contact with each other.

In this case, the total clamping force exerted on the thin-type disc 700 is the sum of the adsorption force generated between the first magnet 104 and the magnetic plate 723 and the adsorption force generated between the second magnet 106 and the magnetic plate 723. Typically, the gap between the first magnet 104 and the magnetic plate 723 is approximately 1.3 mm, and as shown in FIG. 5, the adsorption force in this case is approximately 70 gf. On the other hand, the gap between the second magnet 106 and the magnetic plate 723 is approximately 0.4 mm, and as shown in FIG. 5, the adsorption force in this case is approximately 270 gf. Accordingly, the total clamping force exerted on the thin-type disc 700 is approximately 340 gf which is in the preferable range of the predetermined clamping force.

The force exerted on the thin-type disc 700 when the thin-type disc 700 is detached from the turn table 102 is identical to the above-mentioned total clamping force, and the value thereof is approximately 340 gf.

As described above, according to the present embodiment, both of two kinds of recording mediums having hubs projecting in heights different from each other, i.e., the MO disc 500 and the thin-type disc 700 can be mounted and secured to the turn table 102 at a clamping force in the predetermined range. Specifically, when the MO disc 500 having a hub with a large projection is mounted, the second magnet 106 adsorbs and comes into contact with the MO disc 500 without generating any clamping force, and the clamping force substantially equal to that generated by the first magnet 104 is exerted on the MO disc 500. On the other hand, when the thin-type disc 700 having a hub with a small projection is mounted, the clamping force substantially identical to the sum of the adsorption force generated by the first magnet 104 and that generated by the second magnet 106 is exerted on the thin-type disc 700. However, in this case, the adsorption force generated by the second magnet 106 is larger than that generated by the first magnet 104, and therefore, the adsorption force generated by the second magnet 106 serves as a main component of the clamping force exerted on the thin-type disc 700. Moreover, when the recording medium (disc) is detached from the turn table 102, the force exerted on the recording medium (disc) can be set to the value in the predetermined range. Accordingly, a compatible magnet type clamping mechanism with high reliability can be achieved.

In the above description, the shaft 101 of the magnet type clamping mechanism 100 is used as a guide for the movement of the second magnet 106. Alternatively, a guiding member for the movement of the second magnet 106 can be provided apart from the shaft 101. Nevertheless, when the shaft 101 serves as the guide for the movement of the second magnet 106, the configuration of the magnet type clamping mechanism 100 can be simplified.

Example 2

Hereinafter, a magnet type clamping mechanism 200 according to the second embodiment of the present invention will be described.

Figure 6:
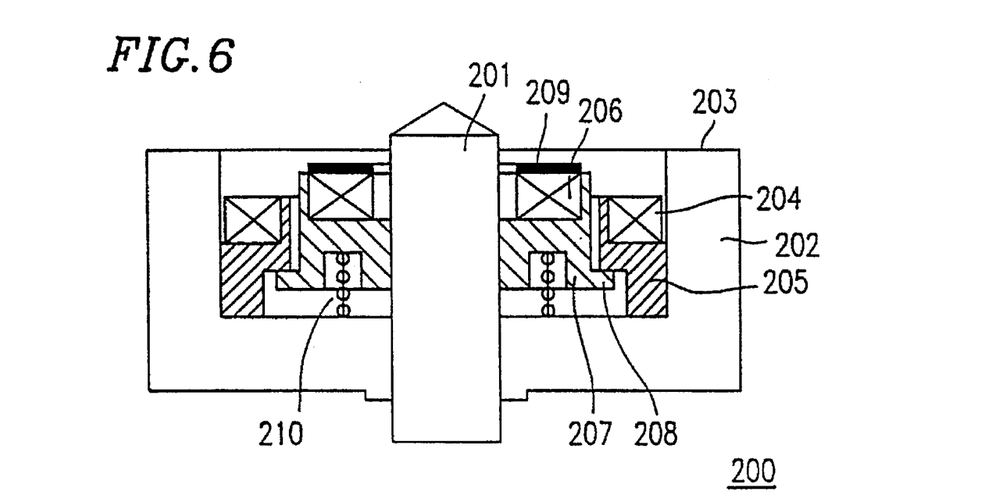
FIG. 6 is a cross-sectional view showing a configuration of a magnet type clamping mechanism according to a second embodiment of the present invention.

FIG. 6 is a cross-sectional view showing the structure of the magnet type clamping mechanism 200. The magnet type clamping mechanism 200 has a structure substantially identical to that of the magnet type clamping mechanism 100 which was described in Example 1. The difference therebetween is that in the magnet type clamping mechanism 200, a compressed coil spring 210, which is an elastic member, is disposed between a second yoke 207 and a concave bottom of a turn table 202 as shown in FIG. 6. Other constituent elements identical to those of the magnet type clamping mechanism 100 in the first embodiment are denoted by the similar reference numerals, and the description thereof will be omitted.

The compressed coil spring 210 maintains the second magnet 206 in a spring-loaded state at the first position. The compressed coil spring 210 is designed so that when the second magnet 206 is at the first position, the spring force, i.e., the force which the compressed coil spring 210 exerts on the second magnet 206 (a second yoke 207) is approximately 20 gf, and when the second magnet 206 is at the second position, the spring force is approximately 25 gf.

Hereinafter, the operation of the magnet type clamping mechanism 200 configured as described above will be described with reference to FIGS. 7 and 8.

First, the case where a MO disc 500, which is a first recording medium, is clamped to the magnet type clamping mechanism 200 will be described.

Figure 7:
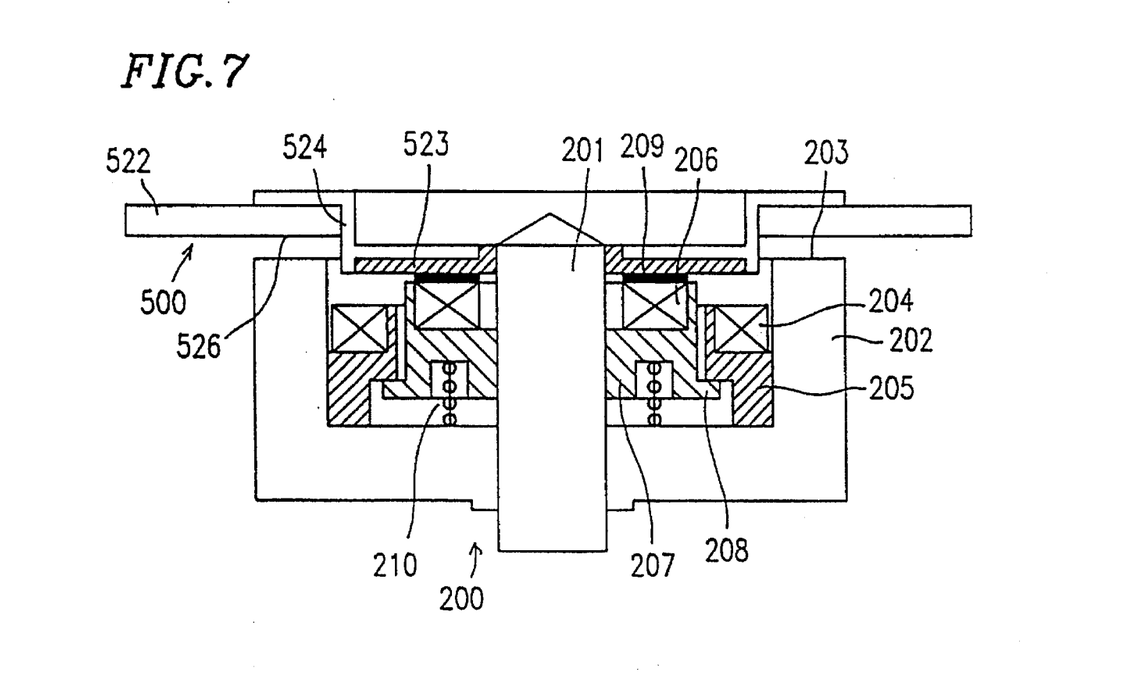
FIG. 7 is a cross-sectional view showing a state in which a spacer of the magnet type clamping mechanism shown in FIG. 6 and a magnetic plate of the first recording medium are in contact with each other.

When the MO disc 500 is brought near the turn table 202 from above, the MO disc 500 is adsorbed to the turn table 202 due to the adsorption force generated between the magnetic plate 523 of the MO disc 500 and the first magnet 204, so that the shaft 201 is inserted into the central hole of the magnetic plate 523. Then, the shaft 201 is projected slightly from the upper side of the magnetic plate 523 and moves until the magnetic plate 523 comes into contact with the spacer 209. FIG. 7 shows the state in which the magnetic plate 523 comes into contact with the spacer 209.

Figure 8:
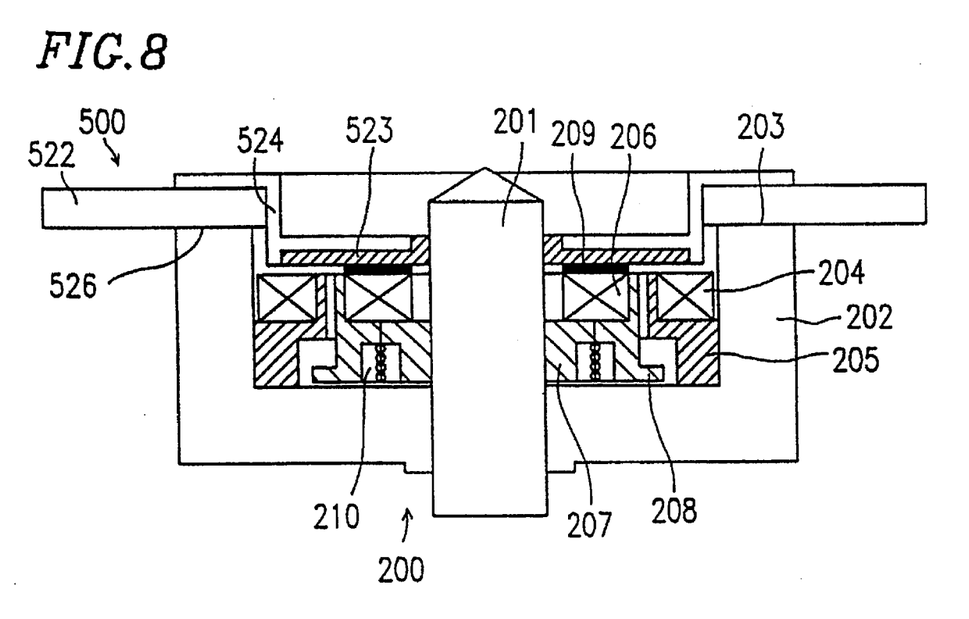
FIG. 8 is a cross-sectional view showing a state in which the first recording medium is clamped to the magnet type clamping mechanism shown in FIG. 6.

In this position, the gap between the magnetic plate 523 and the first magnet 204 is approximately 1.15 mm, and an adsorption force of approximately 75 gf is generated therebetween, as shown in FIG. 5. On the other hand, the second magnet 206 spring-loaded by the compressed coil spring 210 adsorbs and is in contact with the MO disc 500. In this case, the spring force of the compressed coil spring 210 is approximately 20 gf. Since the spring force of the compressed coil spring 210 exerts in a direction opposite to that exerted by the first magnet 204, the magnet plate 523 of the MO disc 500 is subjected to the adsorption force of approximately 55 gf which is the difference therebetween. Thus, the MO disc 500 is adsorbed to the first magnet 204, and moves downward while pressing the second magnet 206 downward in FIG. 7. Accordingly, a clamping face 526 of a substrate 522 is mounted on a turn table face 203 while the shaft 201 gradually projects from the upper side of the magnetic plate 523. As a result, the MO disc 500 is mounted on the turn table 202. FIG. 8 shows the state in which the MO disc 500 is mounted on the turn table 202.

When the MO disc 500 is mounted and secured on the turn table 202, there is a gap of approximately 0.3 mm between the first magnet 204 and the magnetic plate 523. From the graph in FIG. 5 which was described in relation to the first example, the adsorption force generated via the gap of this level is approximately 350 gf. The compressed coil spring 210 exerts a spring force of approximately 25 gf in a direction opposite to the adsorption force in this state. On the other hand, similar to the first embodiment, the second magnet 206 is in contact with the MO disc 500, so that no clamping force is generated. Accordingly, the total clamping force exerted on the MO disc 500 is approximately 325 gf which is the difference between the adsorption force of the first magnet 204 and the spring force of the compressed coil spring 210. This value satisfies the condition that the predetermined clamping force is preferably set in a range of approximately 300 to 500 gf.

The force exerted on the MO disc 500 when the MO disc 500 is detached from the turn table 202 is approximately 460 gf, as is the case of the detachment from the magnet type clamping mechanism 100 in the first embodiment.

In this manner, when the MO disc 500 is mounted, the second magnet 206 does not generate the clamping force, and the MO disc 500 is subjected to the clamping force substantially identical to the difference between the adsorption force generated by the first magnet 204 and the spring force generated by the compressed coil spring 210.

Next, the case where the thin-type disc 700, which is the second recording medium, is clamped will be described.

The operation mechanism of the magnet type clamping mechanism 200 for the thin-type disc 700 is substantially identical to that of the magnet type clamping mechanism 100 which was described in the first embodiment. Accordingly, the detailed description thereof will be omitted.

In the magnet type clamping mechanism 200 of the present embodiment, the second magnet 206 is spring-loaded by the compressed coil spring 210 and positioned in the first position in advance. Accordingly, unlike the case of the first embodiment, there is no need to move the second magnet 206 to the first position prior to adsorbing the thin-type disc 700 which is the second record medium.

Similar to the case of the first embodiment, the thin-type disc 700 is subjected to the clamping force substantially identical to the sum of the adsorption force generated by the first magnet 204 and that generated by the second magnet 206. However, in this case, the adsorption force generated by the second magnet 206 is larger than that generated by the first magnet 204, and therefore, the adsorption force generated by the second magnet 206 serves as a main component of the clamping force exerted on the thin-type disc 700.

Herein, since the second magnet 206 does not directly come into contact with the thin-type disc 700, the spring force provided to the second magnet 206 by the compressed coil spring 210 is not transferred to the thin-type disc 700, and does not reduce the adsorption force for the thin-type disc 700.

Rather, since the second magnet 206 is in a position close to the magnetic plate 723 when the thin-type disc 700 is mounted on the turn table 202, a larger adsorption force is exerted between the second magnet 206 and the magnetic plate 723 as compared with the first embodiment. As a result, more stable operation for mounting the thin-type disc 700 can be achieved. Accordingly, the thin-type disc 700 is clamped with high stability, thereby improving the credibility.

In the first and second embodiments described above, a compatible magnet type clamping mechanism including a turn table with a shaft is described in accordance with the present invention. However, the present invention is not limited to this specific configuration. Alternatively, the present invention can be realized by using a turn table with no shaft. In this case, a movable magnet which corresponds to the second magnet in the above description is disposed on the outer side of the turn table, and a secured magnet which corresponds to the first magnet is disposed on the inner side of the turn table, whereby the present invention can be easily achieved.

In the above description, the diameter of the magnetic plate included in a recording medium (disc) to be clamped is set to approximately 14 mm, a predetermined clamping force is set in a range of approximately 300 to 500 gf, and a stress exerted on the recording medium is set to 510 gf or less. Nevertheless, the present is not limited to these specific values. Alternatively, for example, even when the diameter of the magnetic plate is larger and the predetermined clamping force is smaller as compared with those described above, the adsorption force exerted between the first magnet and the second magnet can be reduced without affecting the movement of the second magnet by expanding the distance between the first magnet and the second magnet. In this case, yokes which are intended to provide magnetic shield can be eliminated.

Furthermore, in the case where a force exerted on a recording medium is not too large, a magnetic plate and a magnet can directly come into contact with each other without mounting and securing a spacer on a movable magnet.

Although the compressed coil spring 210 is used as means for spring-loading the second magnet in the above description, other members can be also used as far as they provide an appropriate spring force; for example, a blade spring can be used instead of the compressed coil spring 210.

Example 3

Hereinafter, a configuration of a disc driving apparatus in which a magnet type clamping mechanism according to the present invention is used will be described as a third embodiment of the present invention.

Figure 9:
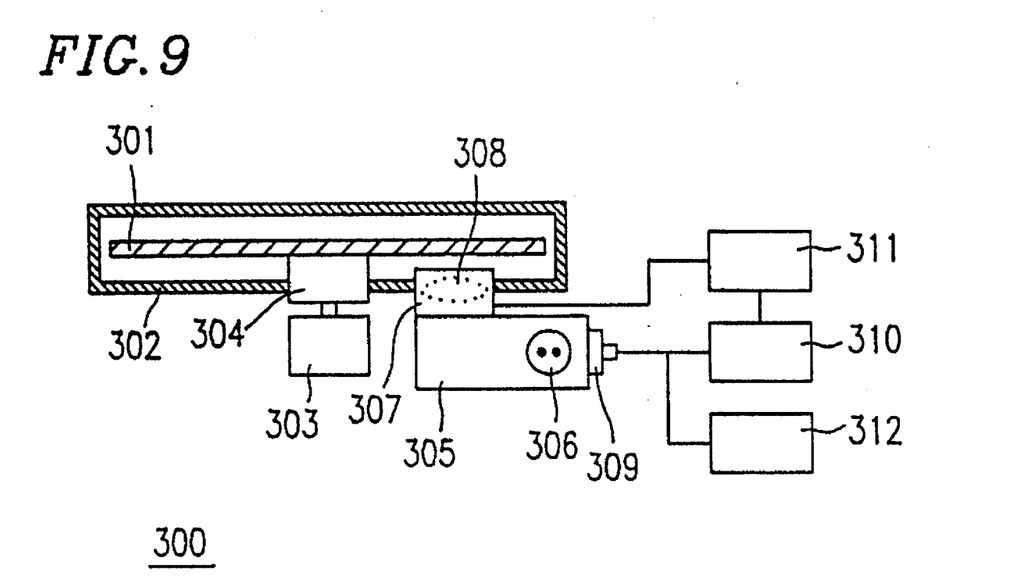
FIG. 9 is a cross-sectional view showing a disc driving apparatus according to the present invention.

FIG. 9 is a cross-sectional view showing a configuration of a disc driving apparatus 300.

In the disc driving apparatus 300, a recording medium 301 (for example, the MO disc 500 or the thin-type disc 700 described above; hereinafter, also referred to as the "disc" in some cases) accommodated in a cartridge 302 is mounted on a turn table 304 so as to be rotated. The turn table 304 is rotated by a disc motor 303 connected thereto via a shaft.

The disc driving apparatus 300 further includes an optical pickup 305 with a semiconductor laser 306 to be used for reading out information from the recording medium 301. The optical pickup 305 further includes an object lens 308, an actuator 307 used for inducing the object lens 308 to follow the undesirable movement and the eccentricity of the information truck formed in the disc 301, and an optical detector 309 receiving and detecting a light reflected from the information truck on the disc 301. An optical system for reading out information recorded in the recording medium (disc) 301 is configured by the semiconductor laser 306, the optical pickup 305, the object lens 308, the optical detector 309, and the like.

To the optical detector 309, a control circuit 310 generating a control signal from the signal output from the optical detector 309 and a signal circuit 312 generating an information signal from the signal output from the optical detector 309 are connected. To the control circuit 310, a driving circuit 311 used for driving the actuator 307 based on the control signal is connected.

The disc 301 accommodated in the cartridge 302 is held at a predetermined position in the disc driving apparatus 300 by a loading mechanism thereof. In operation, the disc 300 is held on the turn table 304 so as to be opposed to the optical pickup 305. After that, the turn table 304 is rotated by the operation of the disc motor 303, and as a result, the disc 301 mounted thereon is also rotated.

A light beam emitted from the semiconductor laser 306 included in the optical pickup 305 passes through the optical system inside the optical pickup 305, and then is incident upon the information truck on the surface of the disc 301 via the object lens 308. The light beam reflected from the disc 301 passes through the object lens 308 again, and further passes through the optical system in the optical pickup 305, so as to be introduced into and detected by the optical detector 309. The signal output from the optical detector 309 is input into the control circuit 310 and the signal circuit 312, so that a control signal for controlling the actuator 307 and an information signal for indicating the record contents are generated based thereon.

The driving circuit 311 drives the actuator 307 based on the control signal from the control circuit 310, so as to induce the object lens 308 to follow the information truck of the disc 301. By reading the output from the signal circuit 312 after the light beam follows the information truck, the information signal recorded in the disc 301 can be read.

In the disc driving apparatus 300 in the configuration as described above, the turn table 304 is configured so as to include the magnet type clamping mechanism according to the present invention as described in Examples 1 and 2 for clamping the disc 301. Thus, it is possible to use the disc driving apparatus 300 for different kinds of discs (recording medium). Accordingly, the disc driving apparatus 300 with compatibility can be realized.

Furthermore, since the magnet type clamping mechanism of the present invention which has been described in relation to Examples 1 and 2 has high reliability, the disc driving apparatus 300 configured by using it also has high reliability.

In a magnet type clamping mechanism configured as described above of the present invention, when a first recording medium having a hub with a large projection is mounted on a turn table, a second magnet adsorbs and comes into contact with a magnetic plate included in the hub of the first record medium and does not generate a clamping force. A first magnet generates a predetermined adsorption force (clamping force). On the other hand, when a second recording medium having a hub with a small projection is mounted on the turn table, the first magnet generates only small adsorption force. The second magnet moves from the second position to the first position by the adsorption force generated by itself, and generates a predetermined clamping force.

As a result, the first magnet mainly provides a clamping force to the first recording medium, and the second magnet mainly provides a clamping force to the second recording medium. Accordingly, a predetermined clamping force can be obtained with respect to two kinds of recording medium (disc) having the projections of hubs, i.e., heights from the clamping face and the surface of the magnetic plate of the record medium different from each other, whereby a compatible magnet type clamping mechanism applicable to two kinds of recording mediums can be obtained.

Moreover, by providing an elastic member maintaining the second magnet in a spring-loaded state at the first position, the second magnet does not move prior to the adsorption of the first recording medium when the first recording medium is mounted on the turn table, thereby improving reliability.

Furthermore, by providing a spacer made of a non-magnetic material on the upper side of the second magnet, a gap of an appropriate size is provided between the second magnet and the magnetic plate of the second recording medium, thereby reducing the adsorption force exerted therebetween. As a result, the second recording medium can be smoothly detached from the turn table, and the unloading can be reduced without damaging the recording medium.

Moreover, by utilizing a spacer made of non-magnetic material as a shock absorber, the impact generated in the adsorption and collision between the magnetic plate of the second recording medium and the second magnet can be suppressed, thereby preventing the generation of impact noise and damage to the second magnet.

The first magnet can be secured to the first yoke and the second magnet can be secured to the second yoke. The first and second yokes are properly designed for providing magnetic shield so that the first magnet and the second magnet do not adsorb each other. As a result, a stable clamping force is obtained and the mobility load of the second magnet is reduced, and therefore, reliability is improved.

Moreover, in a turn table including a shaft, by using the shaft as the guide for the movement of the second shaft, the clamp configuration is simplified.

As described above, by using a magnet type clamping mechanism according to the present invention, a predetermined clamping force can be obtained with respect to two kinds of recording mediums having heights from the clamping face to the surface of the magnetic plate different from each other (heights of hubs). As a result, a clamping mechanism with compatibility can be obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnet type clamping mechanism, comprising:
   a turn table for mounting and securing a recording medium thereon;
   a first magnet fixed at a prescribed position on the turn table; and
   a second magnet operatively movable between a first position and a second position relative to the turn table,
   wherein the recording medium includes at least a first recording medium having a hub with a first amount of projection and a second recording medium having a hub with a second amount of projection which is smaller than the first amount of projection,
   the first magnet is fixed at a position at which a first absorption force is generated on the first recording medium via a first gap in a first condition where the first recording medium is placed on the turn table, and the second magnet is in contact with the first recording medium in the first condition to generate no absorption force with respect to the first recording medium, thereby the first magnet generating a main component of a clamping force for the first recording medium in the first condition, and
   in a second condition where the second recording medium is placed on the turn table, the second magnet generates a second absorption force on the second recording medium via a second gap and the first magnet generates a third absorption force in a same direction as but smaller than the second absorption force via a third gap on to the second recording medium, thereby the second magnet generating a main component of a clamping force for the second recording medium.

2. A magnet type clamping mechanism according to claim 1, wherein the first recording medium is absorbed and secured on the turn table with a first clamping force which is substantially equal to the first absorption force generated by the first magnet.

3. A magnet type clamping mechanism according to claim 1, wherein the second recording medium is absorbed and secured on the turn table with a second clamping force which is substantially equal to a sum of the third absorption force generated by the first magnet and the second absorption force generated by the second magnet.

4. A magnet type clamping mechanism according to claim 1, wherein the second magnet moves from the second position toward the first position due to an absorption force generated on to the second recording medium while the second recording medium is mounted and secured on the turn table.

5. A magnet type clamping mechanism according to claim 1, wherein the first position is closer to a surface of the recording medium to be mounted and secured than the second position.

6. A magnet type clamping mechanism according to claim 1, further comprising an elastic member for maintaining the second magnet in a spring-loaded state at the first position.

7. A magnet type clamping mechanism according to claim 6, wherein the elastic member generates a spring force which is smaller than an absorption force generated between the first magnet and the first recording medium when the second magnet is positioned at the first position.

8. A magnet type clamping mechanism according to claim 6, wherein the first recording medium is absorbed and secured on the turn table with a third clamping force which is substantially equal to a difference between the first absorption force generated by the first magnet and the spring force generated by the elastic member.

9. A magnet type clamping mechanism according to claim 6, wherein the elastic member is a compressed coil spring.

10. A magnet type clamping mechanism according to claim 1, further comprising a non-magnetic spacer provided on an upper face of the second magnet.

11. A magnet type clamping mechanism according to claim 10, wherein the spacer is a member for absorbing impact.

12. A magnet type clamping mechanism according to claim 10, wherein a thickness of the spacer is smaller than a gap between the hub of the second recording medium and the upper face of the second magnet in the second condition.

13. A magnet type clamping mechanism according to claim 1, further comprising a first yoke and a second yoke, the first magnet being fixed on the first yoke and the second magnet being fixed on the second yoke.

14. A magnet type clamping mechanism according to claim 13, wherein the first yoke and the second yoke respectively have a shape which provides a magnetic shield between the first magnet and the second magnet so as to prevent the first magnet and the second magnet from being absorbed to each other.

15. A magnet type clamping mechanism according to claim 13, wherein the turn table includes a shaft made of a non-magnetic material and the second yoke includes a through hole, the shaft penetrating the through hole, thereby the second magnet moving as being guided by the shaft.

16. A magnet type clamping mechanism according to claim 13, wherein a fringe of the second yoke is formed so as to come into contact with the first yoke at the first position.

17. A disc driving apparatus, comprising:
the magnet type clamping mechanism according to claim 1;
an optical system for emitting light beams to the recording medium and for receiving and detecting reflected light beams from the recording medium to read out information recorded on the recording medium; and
a circuitry for generating a signal indicative of the information recorded on the recording medium based on a detection result by the optical system.

* * * * *